United States Patent [19]

Koontz

[11] Patent Number: 4,994,650
[45] Date of Patent: Feb. 19, 1991

[54] ELECTRIC FIELD DETECTOR FOR A HEATABLE WINDSHIELD

[75] Inventor: Harry S. Koontz, Pittsburgh, Pa.
[73] Assignee: PPG Industries, Inc., Pittsburgh, Pa.
[21] Appl. No.: 444,206
[22] Filed: Dec. 1, 1989
[51] Int. Cl.[5] .............................................. H05B 1/02
[52] U.S. Cl. ..................... 219/497; 219/505; 219/522; 219/541; 219/203; 361/104
[58] Field of Search ............... 219/522, 543, 509, 497, 219/494, 501, 505, 203, 547, 541; 361/104

[56] References Cited

U.S. PATENT DOCUMENTS

| | | | |
|---|---|---|---|
| 3,876,862 | 4/1975 | Newman et al. | 219/509 |
| 3,892,947 | 7/1975 | Strengholt | 219/522 |
| 3,941,975 | 3/1976 | Newman et al. | 219/203 |
| 4,057,671 | 11/1977 | Shoop | 428/208 |
| 4,323,726 | 4/1982 | Criss et al. | 174/68 |
| 4,543,466 | 9/1985 | Ramus | 219/203 |
| 4,565,919 | 1/1986 | Bitter et al. | 219/509 |
| 4,610,771 | 9/1986 | Gillery | 204/192 |
| 4,668,270 | 5/1986 | Ramus | 65/106 |
| 4,808,799 | 2/1989 | Schave | 219/522 |
| 4,820,902 | 4/1989 | Gillery | 219/203 |
| 4,829,163 | 5/1989 | Rausch et al. | 219/547 |

FOREIGN PATENT DOCUMENTS 0325145  7/1989  European Pat. Off. ............ 219/203

Primary Examiner—M. H. Paschall
Attorney, Agent, or Firm—Donald C. Lepiane; Andrew C. Siminerio

[57] ABSTRACT

An electric field detector for a heatable windshield includes detector lines which extend around a portion of the perimeter of the windshield between the edge of the windshield's electroconductive coating and the leads to one of the windshield bus bars and are electrically insulated from the coating, bus bars and leads. The detector lines are electrically interconnected to the coating by a tab at a predetermined location between the bus bars. As electrical current passes through the coating, voltage in the coating at the predetermined location is monitored and the current to the coating is interrupted in response to predetermined variations in the measured coating voltage.

21 Claims, 3 Drawing Sheets

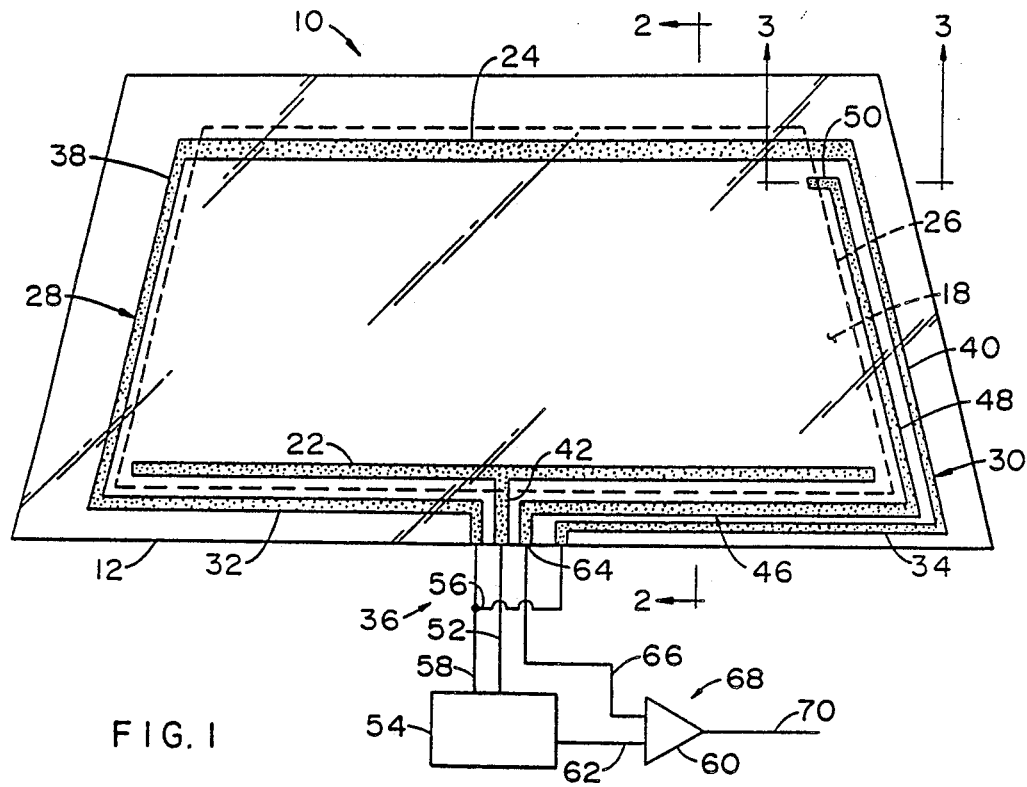
FIG. 1
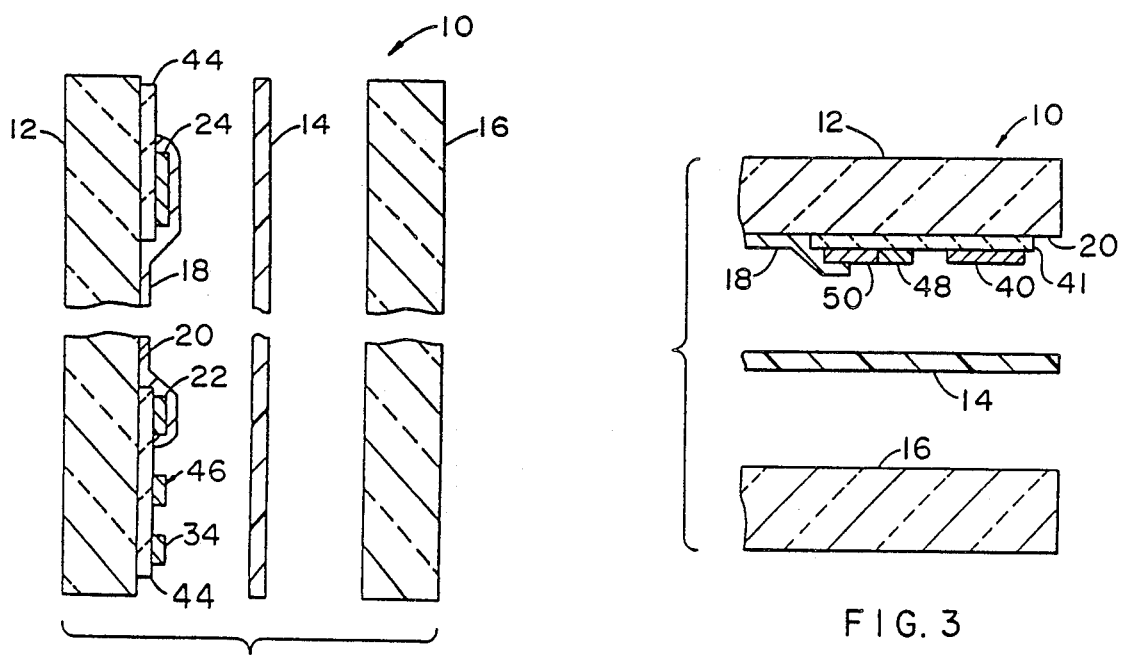
FIG. 2
FIG. 3

ELECTRIC FIELD DETECTOR FOR A HEATABLE WINDSHIELD

BACKGROUND OF THE INVENTION

This invention relates to an electric field detector in an electrically heatable transparency and in particular to a detector usable with a heatable windshield that senses a change in the voltage in the electrically heatable coating of the windshield which would be associated with a break in the leads to the bus bars and interrupt electrical power to the windshield to prevent arcing and additional damage to the heatable windshield.

2a. Technical Considerations

It has been known to pass electric current through a bus bar and transparent conductive coating to another bus bar on the surface of a transparency to raise its temperature. Automotive transparencies, and in particular heatable windshields, include an electrically conductive coating on a major surface of the windshield, interconnected by a pair of opposing bus bars. Typical heatable windshield configurations include either single or dual power lead to the bus bars. In the former configuration, the opposing bus bars are each connected to a single power lead. In the latter configuration, power is provided to at least one of the bus bars by dual leads, each attached to opposite ends of the bus bar. In this fashion, if one of the leads fails, the other can still supply power to the bus bar and maintain the windshield's operation.

One mode of failure of heatable transparencies is localized overheating of the bus bars and/or leads which results from arcing when current moves through a defective power lead or bus bar. In the instance where the transparency is a laminated windshield, the overheating caused by arcing can damage the plastic interlayer, or in severe cases, damage the laminated transparency thus adversely affecting its occupant retention capability.

It has been suggested to detect power discontinuities in the bus bar leads by using a sensor lead that either extends along a bus bar power lead and is connected to the bus bar system at the juncture between the power lead and bus bar or at some other location along the bus bar. The current passing through the power lead to the bus bar is monitored via the sensor line for a predetermined voltage drop which would indicate that the lead adjacent the sensor line is damaged. However, such a sensor arrangement would not detect a discontinuity in the lead to the other bus bar since the sensor line only monitors the current to one of the bus bars. In addition, this sensor configuration used in combination with a dual feed bus bar configuration would effectively negate one of the advantages of using a dual feed configuration, namely a break in the sensor line adjacent one of the power leads to the dual feed bus bar would terminate power to the windshield even though the other lead to the bus bar allows the windshield to continue operation.

It would be advantageous to have the capability of detecting a defect in either bus bar power lead in the electrical heating system of a heatable windshield of the type which may result in overheating and interrupting current flow to the bus bars before the windshield is permanently damaged.

2B. Patent of Interest

U.S. Pat. No. 31876,862 to Newman et al. teaches a circuit breaker for an electrically energized glass panel. An electroconductive coating interconnects pairs of opposing bus bars and a frangible strip extends around the periphery of the bus bars and coating. When the frangible strip breaks, electrical power to the panel is interrupted.

U.S. Pat. No. 3,892,947 to Strengholt teaches an electrically heated panel with anti-shock conductive strips. An electroconductive strip which functions as a bus bar extends around the periphery of the panel before contacting any portion of an electrically conductive coating on the panel surface. A single break or fracture in the strip will prevent any current from flowing to the coating.

U.S. Pat. No. 4,057,671 to Shoop, U.S. Pat. No. 4,323,726 to Criss et al., and U.S. Pat. Nos. 4,543,466 and 4,668,270 to Ramus teach a heated laminated window with an electroconductive coating or a wire grid extending between a pair of spaced bus bars. Current passes from one bus bar, through the coating or wire grid, to the opposite bus bar to heat the window.

U.S. Pat. No. 4,565,919 to Bitter, et al, teaches a crack detector circuit that detects a crack in the electroconductive coating in a heatable windshield. The circuit monitors the resistance of the coating by comparing the voltage applied to the electroconductive coating through one bus bar to the output voltage of the coating through the opposing bus bar. A control switch terminates power to the coating when this proportion assumes an unacceptable value indicating that the coating has cracked.

U.S. Pat. No. 4,808,799 to Schave and U.S. Pat. No. 4,829,163 to Rausch et al. teach a crack detector for a heatable windshield having an electroconductive coating which electrically interconnects a pair of opposing bus bars. A crack detector extends along the lead to the upper bus bar and is electrically interconnected to either the upper bus or the lead at the junction between the upper bus bar and the lead. The voltage in the lead or upper bus bar is monitored through the crack detector which terminates power to the windshield if the monitored voltage of the lead or upper bus bar differs from a reference voltage by a predetermined amount.

SUMMARY OF THE INVENTION

The present invention provides an electric field detector to detect a discontinuity, i.e. break, in the leads of a heatable windshield and prevent arcing and associated overheating of the windshield resulting from such a condition. A heatable windshield typically includes an electroconductive heating coating on a surface of one of the glass plies of the windshield, electrically interconnecting a pair of spaced apart, upper and lower bus bars. Leads are provided to the bus bars to supply power to the coating. As current passes through the coating, the applied voltage distributed between the bus bars varies such that a voltage at a particular location in the coating depends on the physical location of that particular location of the coating relative to the bus bars. An electric field detector includes a detector line that extends between the peripheral edge of the coating and one of the bus bar leads. A tab at one end of the detector line electrically interconnects the detector line with the coating at a predetermined location between the bus bars. The detector monitors the voltage of the electroconductive coating of the windshield and terminates power to the windshield if the monitored voltage changes more than a predetermined amount from a reference level voltage, indicating that one of the bus bar leads has failed.

In one particular embodiment of the invention, the heatable windshield is a dual lead windshield which provides two power leads to the upper bus bar so that the windshield can remain operational when one of the dual leads fails. The detector disclosed in the present invention allows the windshield to continue operation under such conditions but will detect a condition wherein both of the dual leads to the upper bus bar and/or the lead to the lower bus bar fail so as to prevent localized overheating of the windshield due to arcing.

BRIEF DESCRIPTION OF THE DRAWINGS

FIG. 1 is a schematic view of a heatable windshield incorporating features of the present invention.

FIG. 2 is an exploded cross-sectional view taken along line 2-2 of FIG. 1 illustrating the electroconductive coating, upper and lower bus bars, upper bus bar lead, and electric field detector line of the present invention.

FIG. 3 is an exploded cross-sectional view taken along line 3-3 of FIG. 1 illustrating the connection between the electric field detector line and the electroconductive coating.

DETAILED DESCRIPTION OF THE INVENTION

Figure 4:
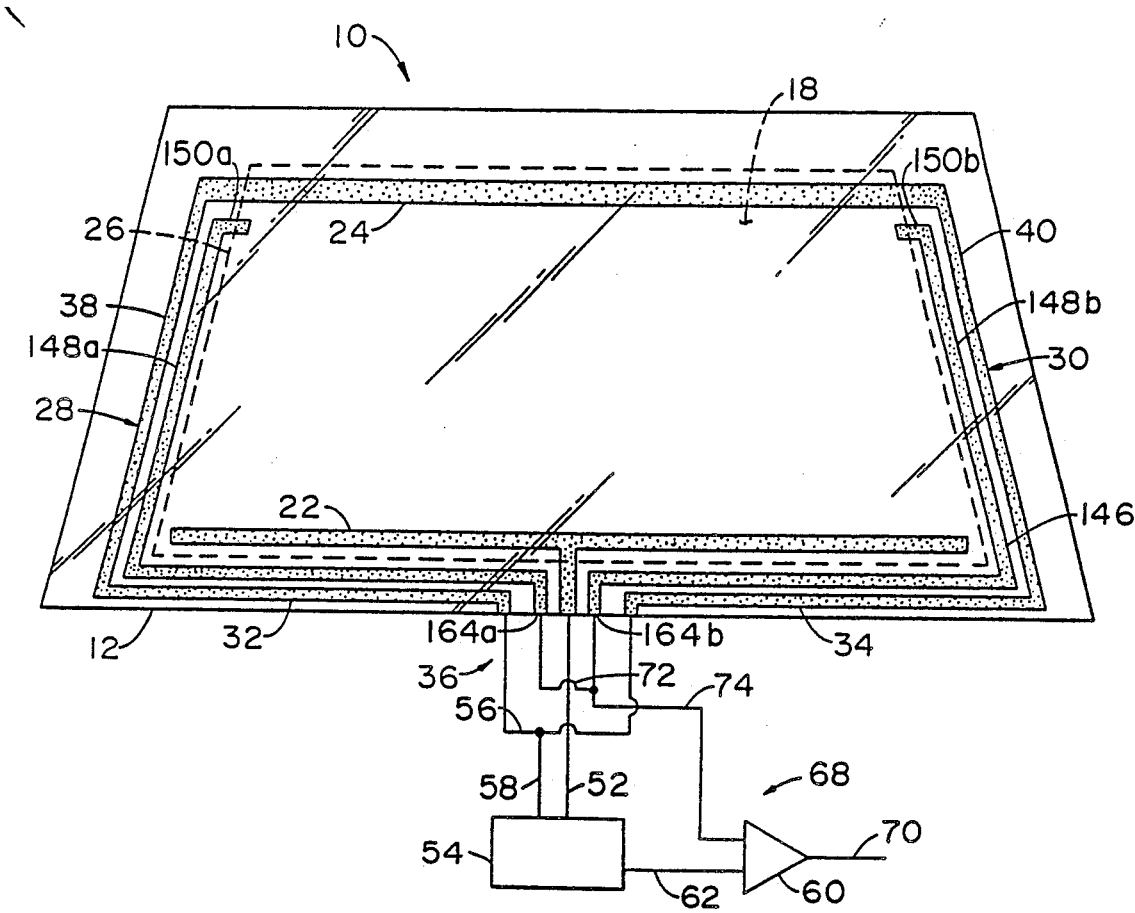
FIG. 4 is a schematic view of an alternate embodiment of the invention.

The present invention is described in combination with a laminated transparency comprised of two plies of glass bonded together by an interlayer of plastic, and in particular a windshield, but as can be appreciated by those skilled in the art, the present invention may be incorporated into any type of heatable transparency where the temperature of the transparency is monitored.

The present invention teaches an electric field detector for a heatable windshield. Although the present invention is describe din combination with a dual lead bus bar configuration as disclosed in U.S. Pat. No. 4,820,902 to Gillery, which teachings are hereby incorporated by reference, the invention can also be used in combination with a single lead bus bar configuration as disclosed in U.S. Pat. No. 4,543,466 to Ramus. The detector taught in the present invention allows a dual lead heatable windshield to remain operational when only one of the two leads to the dual lead bus bar is defective but will interrupt power to the bus bars when it senses a change in the current passing through the electroconductive coating in the windshield, indicating that both leads to the dual lead bus bar and/or the lead to the opposing bus bar is defective.

Referring to FIGS. 1, 2, and 3, the transparency 10 includes an outboard glass ply 12, i.e. the ply furthest from the vehicle interior, a plastic interlayer 14 (shown only in FIGS. 2 and 3) which may be polyvinylbutyral as is commonly used for laminated windshields, and an inboard glass ply 16 (shown only in FIGS. 2 and 3). A heating arrangement is provided to heat the transparency 10. Although not limiting in the present invention, in the preferred embodiment, the heating arrangement includes an electroconductive coating 18 preferably positioned on the inside surface 20 of the outboard glass ply 12. Various coatings may exhibit the necessary combination of transparency and electroconductivity required to serve as the heating element for the transparency 10, but a preferred coating is similar to that disclosed in U.S. Pat. No. 4,610,771 to Gillery, which teachings are hereby incorporated by reference. The coating comprises a film of silver between films of zinc stannate, each of which may be applied sequentially by magnetron sputtering. The silver acts as an electroconductive layer and the zinc stannate films serve to mask the reflectance of the silver. In a preferred embodiment of the invention, the coating exhibits an approximate resistivity of about 7 to 8 ohms per square when the silver layer has a thickness of about 110 angstroms.

A bottom bus bar 22 and top bus bar 24 are positioned on the glass ply 12 to be in contact with the coating 18 as shown in FIGS. 1 and 2. Peripheral edge 26 of the coating 18 is spaced form edge of the transparency 10. The uncoated marginal areas may be provided by masking these selected portions of the transparency 10 during the coating process. Optionally, the entire glass sheet could be coated and the coating subsequently deleted from those areas. The uncoated marginal areas permit electrical connections to be made to the upper bus bar 24 without contacting the coating 18 or the bottom bus bar 22. The connection to the upper bus bar 24 of the windshield 10 includes a pair of leads 28 and 30 having conductive strips 32 and 34, respectively, extending in opposite directions along the bottom edge of the windshield 10 from the terminal area 36 and conductive side strips 38 and 40 extending along opposite side portions which connect strips 32 and 34, respectively, to opposite ends of upper bus bar 24. With this dual lead configuration, power is supplied to both ends of the upper bus bar 24 resulting in a more even power distribution across the length of the bus bar 24 and through the electroconductive coating 18. In addition, a break in one lead will not terminate power to the upper bus bar 24 but rather the power can be supplied through the remaining lead. Lead 42 connects the lower bus bar 22 with the terminal area 36. As shown in FIG. 1, the strips 32, 34, 38, and 40 of leads 28 and 30 to the upper bus bar 24 and the lead 42 to the lower bus bar 22 all are positioned within the uncoated, marginal area of the windshield 10. Although not limiting in the present invention, the electrical connections to the bottom bus bar 22 via lead 42 and to the top bus bar 24 via leads 28 and 30 are preferably made along the bottom edge of the windshield 10 at terminal 36 as illustrated in FIG. 1 but it should be appreciated that the connections may be made anywhere about the perimeter of the windshield 10.

The bus bars and leads are preferably made of a silver containing ceramic frit material, as is well known in the art, and may be applied in any convenient manner, e.g. screen printing onto the surface 20 of the glass ply 12. After printing, the frit is heated, or "fired", to melt the frit material and fuse it to the glass surface. Optionally, an opaque ceramic enamel border 44 (shown only in FIG. 2 and 3) may be applied on surface 20 of the glass ply 12 to hide the bus bars 22 and 24 and leads 28, 30, and 42. The conductivity of the bus bars and leads is chosen to be considerably greater than that of the coating 18 to provide a fairly even power distribution along the bus bars and prevent the bus bars from overheating.

Referring to FIG. 1, electric field detector 46 is electrically interconnected with the coating 18 to monitor the coating voltage at a predetermined location between bus bars 22 and 24. In the particular embodiment of the invention shown in FIG. 1, detector 46 includes an electroconductive line 48 which extends from the terminal area 36 around at least a portion of the electroconductive coating 18, between the lead 30 to the upper bus bar 22 and edge 26 of the coating 18. Detector line 48 includes a tab 50 spaced between the bus bars 22 and 24 and extending into and electrically interconnecting the line 48 with the coating 18 at a predetermined location relative to the bus bars. Although not limiting in the present invention, in the particular embodiment of the invention illustrated in FIG. 1, the tab 50 is spaced in close proximity to the upper bus bar 24 and is completely on the ceramic band 44 as shown in FIG. 3 so that it cannot be seen when viewing the windshield 10 through outer glass ply 12. However, the tab 50 can be at other locations between bus bars 22 and 24 and may also extend into the viewing area of the windshield 10, if permissible. The detector line 48 and tab 50 are preferably the same material as the bus bars and leads and are applied during the same screen printing operation.

With continued reference to FIG. 1, electrical lead 52 connects the lower bus bar 22 to one pole of an electrical power source 54. Leads 28 and 30 leading to the upper bus bar 24 are wired in common to the opposite pole of power source 54 by means of a jumper wire 56 and lead 58. Voltage comparator 60 is connected to power source 54 by wire 62. End 64 of the detector line 48 at the terminal area 36 is connected to the comparator 60 by wire 66.

In principle, when power is applied to an electrically heatable windshield, an electric field is established in the electroconductive coating between the bus bars. The voltage within the electric field is fairly linearly distributed such that a voltage at a particular location in the coating is proportional to the physical location of that particular location relative to the bus bars. For a given location, if the applied voltage changes, the voltage at that given location will change proportionally. As a result, when a field detector detects a predetermined amount of change in the coating voltage, it can be assumed that a lead to one of the bus bars has a discontinuity, i.e. break. In this manner, the electric field detector 46 of the present invention operates to detect a break in the leads 28 and 30 and/or lead 42 by monitoring the voltage in the coating 18 at the tab 50 via the detector line 48. Although not limiting in the present invention, for the purpose of the following discussion, it will be presumed that the current moves through coating 18 from the upper bus bar 24 to the lower bus bar 22 so that the voltage drop within the coating 18 is from the upper to lower bus bar. In the particular embodiment illustrated in FIG. 1, a reference voltage is provided to the comparator 60 from the power source 54. The current flows through the leads 28 and 30 to the upper bus bar 24, through the coating 18 and to the lower bus bar 22 and lead 42. The detector line 48 is electrically interconnected to the coating 18 by the tab 50 at a predetermined location between bus bars 22 and 24. The voltage of the coating 18 is monitored by a circuit 68 which includes comparator 60 as shown in FIG. 1. The comparator 60 continuously compares the reference voltage from the power source 54 to the measured voltage of the coating 18 via detector line 48 and wire 66. When the measured voltage form the detector line 48 differs from the reference voltage by a predetermined amount, that amount being indicative of a break in both leads 28 and 30 or lead 42, or in the alternative exceeds or drops below predetermined voltage reference values, the reference values being indicative of a break in both leads 28 and 30 or lead 42, an output signal from circuit 68 is generated through lead 70 which will terminate the power to the windshield 10 to prevent arcing and associated localized overheating within the windshield 10.

As discussed earlier, the dual lead configuration to the upper bus bar 24 as shown in FIG. 1 allows one lead to break and still power the windshield 10 by directing the power through the remaining lead. The electric field detector 46 taught in the present invention recognizes this advantage and will not interrupt power to the windshield 10 if only one of the leads is broken. More specifically, power is supplied to the upper bus bar 24, coating 18 and detector line 48 through two electroconductive paths, i.e. via leads 28 and 30. As a result, if either lead, for example lead 28, breaks so that all the power to the upper bus bar 24 is supplied through lead 30, the measured coating voltage will not change appreciably because power will continue to be supplied to the detector line 48 through coating 18 and the tab 50 and the electric field detector 46 will allow the windshield 10 to continue to function even though one of the leads to the upper bus bar 24 is inoperative. WHen both leads are defective so that full power can no longer reach the upper bus bar 24 and pass through the coating 18, the voltage level increases and the current tries to bridge the break in the lead, resulting in localized overheating due to the arcing that can damage the windshield 10. When the power the upper bus bar 24 is reduced the current passing through the coating 18 is reduced resulting in a reduction in the monitored coating voltage at the tab 50. If the measured coating voltage from the detector line 48 differs from the reference voltage by more than the predetermined amount, indicating that there is a break in both of leads 28 and 30, circuit 68 will generate a signal that will terminate power to the windshield 10.

Similarly, if the lead 42 to the lower bus bar 22 breaks, little or no current can flow through the coating 18 and out lead 42. Since the amount of current passing through the coating 18 is greatly reduced, there will be little or no voltage drop between the bus bars and the entire coating 18 will assume a voltage approximating that of the upper bus bar 24. As a result, the coating voltage measured by the detector 46 will be greater than the expected measured coating voltage. This increase in coating voltage will be detected by circuit 68 which will, if necessary, terminate power to the windshield 10.

Although not limiting in the present invention, to illustrate the particular mode of operation of the detector 46 discussed above, assume that the voltage in the coating 18 varies approximately linearly between the upper bus bar 24 and the lower bus bar 22 from 100 to 0 volts and further assume that tab 50 is spaced midway between the bus bars. Because the voltage distribution varies almost linearly between the bus bars, under normal operating conditions, the voltage at the tab 50 should be approximately half the total voltage drop between the bus bars, or 50 volts. Taking into account possible fluctuations in the power to the windshield 10, the circuit 68 will allow the windshield 10 to operate as long as the monitored voltage at tab 50 is within a predetermined allowable operating range. Assuming that this predetermined range is 10 volts, the windshield 10 will continue to operate as long as the monitored coating voltage at tab 50 is within 40 to 60 volts. As previously discussed, when both the leads 28 and 30 to the upper bus bar 24 break, the voltage level at the upper bus bar 24 is greatly reduced. For the purpose of this example, assume 60% of the total voltage, i.e. 60 volts, is present at the upper bus bar 24. The resulting reduced current which passes through the coating 18 will cause to voltage to drop from 60 volts at the upper bus bar 24 toward 0 volts at the lower bus bar 22. The monitored coating voltage at tab 50 will be 30 volts which is outside of the predetermined allowable operating range. As a result, the circuit 68 will generate a signal that will terminate power to the windshield 10. Similarly, as previously discussed, when lead 42 breaks, the voltage drop between the bus bars 22 and 24 is greatly reduced. Again for the purpose of illustration, assume that there is only a 10 volt drop between the bus bars, i.e. the voltage level at the upper bus bar 24 is 100 volts and the voltage at the lower bus bar 22 is 90 volts. As a result, the monitored coating voltage at the tab 50 will be 95 volts which is outside the predetermined allowable operating range so that the circuit 68 will generate a signal to terminate power to the windshield 10.

Figure 6:
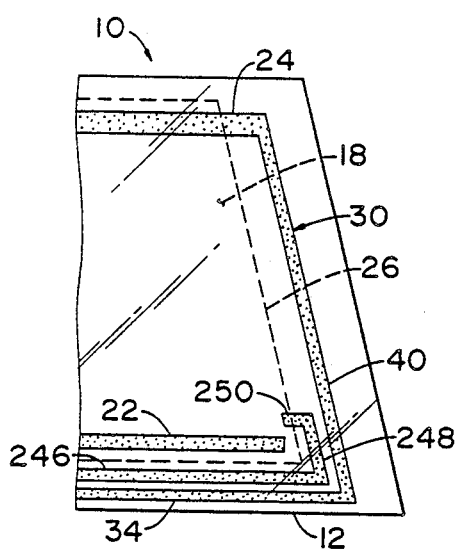
FIGS. 6 and 7 are partial schematic views of additional embodiments of the invention.

Based on the discussion above, it is apparent that if the tab 50 is located close to one of the bus bars so that the expected monitored coating voltage under normal operating conditions is close to the voltage of that adjacent bus bar, the predetermined allowable operating range for the monitored coating voltage must be reduced in order to retain the detector's ability to detect a break in either both the leads 28 and 30 or the lead 42. In particular, referring to FIG. 1, assume that tab 50 is positioned close to upper bus bar 24 so that the monitored coating voltage at the tab 50 under normal operating conditions is 95 volts. As discussed earlier, under the condition where the bottom bus bar lead 42 breaks, the monitored coating voltage will increase. However, if the predetermined allowable operating range is 10 volts, the detector 46 will not operate to terminate power to the windshield 10 because the increase in monitored coating voltage at the tab 50 cannot exceed 100 volts which is within the allowable operating range. As a result, the allowable increase in voltage must be reduced while the allowable reduction in voltage can remain the same. Similarly, if the tab 50 is positioned near the lower bus bar 22 as shown in FIG. 6 (which will be discussed later in more detail) so that the monitored coating voltage at tab 50 is 5 volts and the predetermined allowable operating range is 10 volts, under the condition where the upper bus bars leads 28 and 30 both break so that the monitored coating voltage at tab 50 is close to 0 volts, the detector will not terminate power to the windshield 10 since a monitored coating voltage of 0 volts is within the allowable operating range. In this situation, the allowable decrease in voltage should be reduced while the allowable increase in voltage can remain the same.

It is obvious that if the line 48 of the detector 48 breaks, it is possible that the circuit 68 will interrupt power to the windshield 10 even though it is still operational. For example, if a crack at the perimeter of the windshield 10 extends through the line 48, the comparator 60 will receive a voltage reading indicative of a break in both leads 28 and 30 even though one or both is still functional.

The possibility of a defective or broken detector line 48 giving an incorrect indication of the windshield 10's condition can be reduced by adding a second detector line. Referring to FIG. 4, electric field detector 146 includes two separate lines 148a and 148b each extending between the leads 28 and 30 and the coating edge 26. Tabs 150a and 150b electrically interconnect the lines 148a and 148b, respectively, with the coating 18 at a predetermined location between the upper and lower bus bars 24 and 22. At terminal 36, ends 164a and 164b of lines 148a and 148b, respectively, are wired in common by jumper wire 72 and connected by lead 74 to the comparator 60. With this detector configuration, either of the lines 148a or 148b can become defective and the detector 146 will operate to allow the windshield to function as discussed. For example, if lead 28 and/or line 148a are defective due to a crack at the edge of the windshield 10 while lead 30 is still functional, power is still provided to the bus bar 24, coating 18, and line 148b so that the detector 146 will maintain the windshield 10's operability. When there is a defect in both leads 28 and 30 so that there is reduced or no power provided to the upper bus bar 24, the signal from the lines 148a and 148b will indicate the defective condition.

Figure 5:
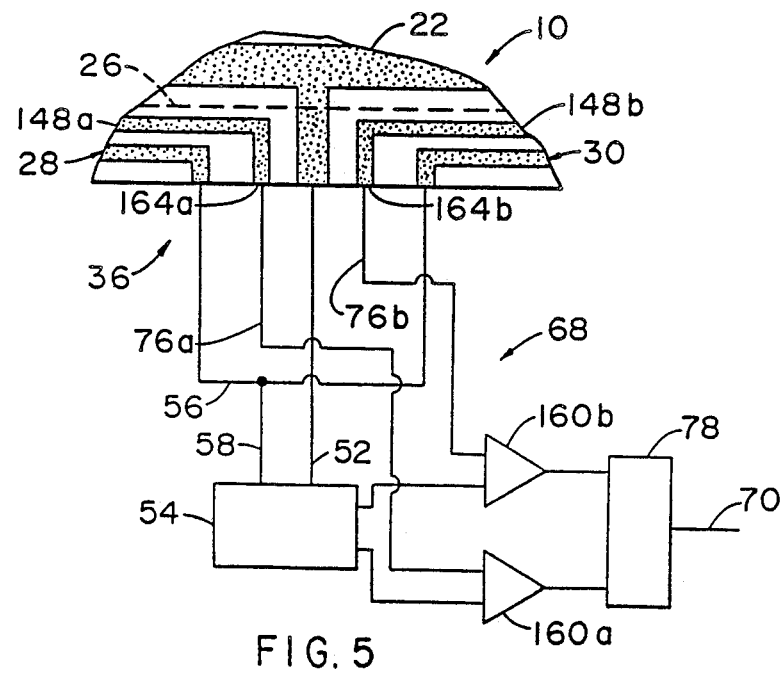
FIG. 5 is a schematic of alternate detector circuitry for the embodiment of the invention shown in FIG. 4.

FIG. 5 shows alternate detector circuitry 168 which allows a defect in either lead 28 or 30 to be detected and indicated without interrupting the power to the windshield 10. End 164a of line 148a is connected by lead 76a to comparator 160a and end 164b of line 148b is connected by lead 76b to comparator 160b. Signals from comparators 160a and 160b are received by controller 78 which can interrupt current to the windshield 10 if either or both comparators indicate a break. A break in either lead can be indicated to the vehicle operator in any convenient manner, for example a light. With this arrangement, a break in either lead can be detected in a windshield 10 that is still operational rather than terminating power to the windshield 10 because of a break in only one of its two leads.

In order to reduce the possibility of the detector line 48 breaking, the line 48 may be shortened so that it extends along only a small portion of strip 40. Referring to FIG. 6, a crack running from an interior portion of the windshield 10 toward strip 40 of the lead 30 will not break the detector line 248 of a detector 246. Tab 250 extends form the end of the line 248 and contacts the coating 18 at a position close to the lower bus bar 22.

While the present invention has been presented in combination with a dual lead heatable windshield, based on the teachings of this disclosure, the detector arrangement can also be used in combination with a single lead bus bar arrangement as discussed earlier. In particular, in a windshield configuration similar to the windshield 10 shown in FIG. 1 but without lead 28, the electric field detector 46 will operate to monitor the voltage in the coating 18 and terminate power to the windshield when there is a change in the monitored voltage by a predetermined amount, indicating a break in either lead 30 or 42, in a manner similar to that discuss earlier. As can be appreciated by one skilled in the art, with a single lead configuration, the detector line 46 can be positioned on the surface 20 or outer ply 12 and extend along lead 30 or along the edge of the ply 12 opposite from strip 40 of the lead 30.

Figure 7:
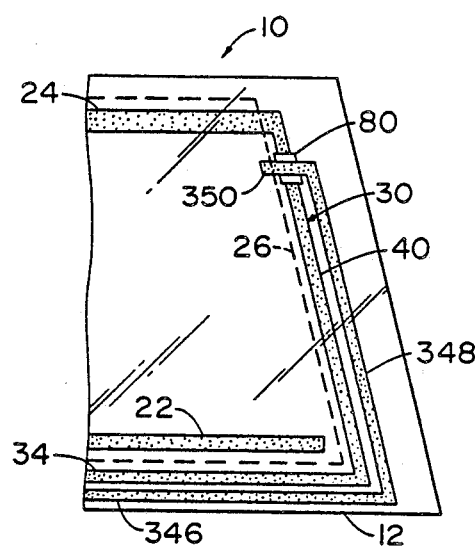

In addition, it would be obvious to one skilled in the art that based on the teachings of this disclosure, the detector line 48 does not have to be positioned between the leads to the upper bus bar 24 and the edge 26 of the coating 18 as shown in FIGS. 1 and 4. Referring to FIG. 7, detector line 348 of a detector 346 can extend along a lead, and in particular the lead 30, between the lead 30 and the peripheral edge of the outer glass sheet 12 of the windshield 10, provided that tab 350 can extend across the lead 30 while remaining electrically insulated therefrom. Tab 350 can be electrically insulated from the strip 40 in any convenient manner known in the art. Although not limiting in the present invention, insulating tape or ceramic enamel 80, can be positioned between tab 350 and the underlying portions of the strip 40.

The forms of this invention shown and described in this disclosure represent illustrative embodiments and it is understood that variations and modifications can be made without departing from the scope of the invention as described hereinbefore and as defined in the following claims.

I claim:

1. An electrically heatable transparency comprising:
a non-electrically conductive substrate;
an electroconductive heating member on said substrate;
a first bus bar electrically connected to said heating member at a first location;
a second bus bar electrically connected to said heating member at a second location spaced from the first location;
means for detecting voltage in said electroconductive heating member; and
means for electrically insulating said detecting means from said first and second bus bars.

2. An electrically heatable transparency comprising:
a non-electrically conductive substrate;
a first bus bar on a surface of said substrate;
a second bus bar on a said surface of said substrate spaced from said first bus bar;
an electroconductive heating member on said substrate interconnecting said first and second bus bars;
at least one electroconductive detector member to detect voltage in said electroconductive heating member, said detector member electrically insulated from said bus bars and said electroconductive member; and
means to electrically interconnect an end of said detector member with said electroconductive heating member at a predetermined location between locations where said first and second bus bars are electrically connected to said electroconductive heating element.

3. The transparency as in claim 2 wherein said heating member is an electroconductive coating on a surface of said substrate, said first bus bar is positioned along a first marginal edge of said substrate in contact with said coating, said second bus bar is positioned along a second opposing marginal edge of said substrate in contact with said coating to pass a current from one of said bus bars through said coating to the other of said bus bars, and at least one electroconductive lead, electrically insulated from said electroconductive coating and said second bus bar and having a first end connected to said first bus bar, wherein said lead extends along a third edge portion of said substrate.

4. The transparency as in claim 3 further including means to measure voltage in said detector member and means responsive to variations in said measured voltage to interrupt current to said transparency.

5. The transparency as in claim 4 wherein said responsive means includes means to compare said measured voltage to a predetermined voltage and means to interrupt said current to said transparency in response to said comparing means when said measured voltage has a predetermined relationship relative to said predetermined voltage.

6. The transparency as in claim 5 wherein said second bus bar, said lead, and said detector member are provided with terminal portions closely adjacent to each other along said second edge of said transparency.

7. The transparency as in claim 5 wherein said substrate is a first glass sheet and further including at least one additional glass sheet wherein said coating, bus bars, lead and detector member on said surface of said first glass sheet are between said glass sheets.

8. The transparency as in claim 5 wherein said coating includes edge portions spaced from the peripheral edge of said substrate and said detector member extends along said surface of said substrate between a portion of said substrate's peripheral edge and said edge portions of said coating.

9. The transparency as in claim 8 wherein said detector member extends along said surface of said substrate between said edge portions of said coating and at least a portion of said lead.

10. The transparency as in claim 8 wherein said detector member extends along said surface of said substrate between said third edge and at least a portion of said lead and said tab overlays a portion of said lead and further including means to electrically insulate said tab from said portion of said lead.

11. The transparency as in claim 8 wherein said electrically interconnecting means includes a tab connecting said end of said detector member with said electroconductive coating at said predetermined location.

12. The transparency as in claim 8 wherein said electroconductive lead is a first lead and further including a second electroconductive lead electrically insulated from said electroconductive coating and said second bus bar and having a first end connected to said first bus bar, wherein said lead extends along a fourth edge portion of said substrate.

13. The transparency as in claim 12 wherein said detector member is a first detector member extending along said surface of said substrate between said third edge and said edge portions of said coating and electrically interconnected with said coating at a first predetermined location between said bus bars and further including a second electroconductive detector member electrically insulated from said coating and bus bars and extending along said surface of said substrate between said fourth edge and said edge portions of said coating and further wherein said electrically interconnecting means connects said second detector member to said electroconductive coating at a second predetermined location between said bus bars.

14. The transparency as in claim 13 wherein said voltage measuring means includes means to measure voltage in each of said detector members and said responsive means includes means to compare each of said measured voltages from said detector members to a predetermined voltage and means to interrupt said current to said transparency in response to said comparing means when both of said measured voltages have a predetermined relationship relative to said predetermined voltage.

15. The transparency as in claim 13 wherein said electrically interconnecting means further includes first and second tabs connecting an end of each of said first and second detector members, respectively, with said electroconductive coating at said first and second predetermined locations, respectively.

16. The transparency as in claim 15 wherein said first detector member extends along said surface of said substrate between said edge portions of said coating and at least a portion of said first lead and second detector member extends along said surface of said substrate between said edge portions of said coating and at least a portion of said second lead.

17. The transparency as in claim 15 wherein said first detector member extends along said surface of said substrate between said third edge and at least a portion of said first lead and second detector member extends along said surface of said substrate between said fourth edge and at least a portion of said second lead, wherein said first and second tabs overlay a selected portion of said first and second leads, respectively, and further including means to electrically insulate said tabs from said selected portions of said first and second leads, respectively.

18. A control for monitoring the current to a heatable transparency of the type having an electroconductive heating member on a surface of a substrate of the transparency, first and second spaced apart bus bars positioned along opposing edge portions of the electroconductive heating means, and means to pass electric current from one of said bus bars through said heating member to the other of the bus bars to heat the transparency, comprising:

means to monitor the voltage of the heating member at a predetermined location between said bus bars;
means responsive to said monitoring means to interrupt the current to the transparency when the voltage has a predetermined relationship relative to a predetermined voltage;
at least one electroconductive detector member insulated from the heating member and bus bars and extending along selected portions of the transparency; and
means to electrically interconnect said detector member with the heating member at the predetermined location.

19. The control as in claim 18 wherein said electroconductive heating member is an electroconductive coating.

20. A method for monitoring the current to a heatable transparency of the type including an electroconductive heating member on a surface of a substrate of the transparency and first and second spaced apart bus bars positioned along opposing edge portions of the heating member, comprising:

providing current to the heating member to heat the transparency;
monitoring the voltage of the heating member at a predetermined location between the bus bars;
terminating the current to the transparency when the voltage has a predetermined relationship relative to a predetermined voltage;
electrically interconnecting an electroconductive detector member with the heating member at the predetermined location; and
electrically insulating said detector member from said heating member and bus bars.

21. The method as in claim 20 wherein the electroconductive heating member is an electroconductive coating.

* * * * *